3,195,128
MOVING TARGET INDICATING SYSTEMS
Guy Le Parquier, Henri Poinsard, and Robert Ducrotoy, Paris, France, assignors to C.S.F.-Compagnie Generale de Telegraphie Sans Fil, a corporation of France
Filed Mar. 8, 1963, Ser. No. 263,876
Claims priority, application France, Mar. 9, 1962, 890,514
6 Claims. (Cl. 343—7.7)

The present invention relates to moving target indicating systems, more particularly for mobile radar systems.

In known mobile radar systems, where it is desired to compensate for that part of the Doppler effect due to the velocity of the radar systems, it is conventional to provide a stabilized local oscillator and on the other hand an oscillator, the frequency of which represents the Doppler effect in the direction concerned, this direction varying of course as a function of the scanning performed by the antenna. In addition a highly stabilized coherent oscillator is necessary for making the elimination of fixed echoes possible.

It is an object of the invention to provide a system for eliminating in moving radar systems the echoes from stationary targets, without it being necessary to provide the radar system with the above equipment.

According to the invention, a radar moving target indicating system comprises means for imparting to the received echoes a delay preferably slightly longer than the duration of a transmitted pulse, a coherent oscillator controlled by the delayed pulses, phase responsive means for supplying a signal which is a function of the phase shift between each undelayed received pulse and the oscillation supplied by said oscillator, and means coupled to said phase responsive means, for comparing two output signals of said phase responsive means separated by a time interval equal to that which separates two transmitted pulses.

According to a preferred embodiment of the invention, the coherent oscillator operates at the intermediate frequency and the signals resulting from the addition of the coherent oscillation and the received echoes at the intermediate frequency, are applied both to a direct and a delayed path leading to a subtracting device before detection thereof.

The invention will be best understood from the following description and appended drawings, wherein.

Figure 1:
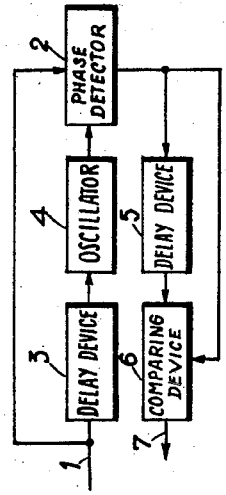
FIG. 1 is a block-diagram embodying the principle of the system according to the invention.

The system shown in FIG. 1 comprises an input 1 to which the received echoes are applied before they are detected, for example at the intermediate frequency.

Input 1 feeds a first input of a phase responsive device 2, such as, for example, an amplitude and phase detector of a known type, which delivers an output signal proportional to the product of the amplitude of the signals applied to the two inputs thereof and of the cosine of their relative phase shift.

Input 1 also feeds a delay device 3 which imparts to the echoes received a delay $t_0$, which is slightly longer than the duration of a radar pulse. The output of the delay device 3 is coupled to an electrode of a coherent oscillator 4, oscillating at the intermediate frequency, so that the latter is successively put in phase with each one of the incoming echoes.

The output of oscillator 4 is connected to the second input of detector 2.

For each echo $R_n$ received from a target $O_n$ at an instant $t_n$ a signal $S_n$ is collected at the output of detector 2.

As the oscillation delivered by oscillator 4 has a constant amplitude, this signal $S_n$ depends on the amplitude of echo $E_n$ and on the phase shift P between this echo and the coherent oscillation which is simultaneously applied to second input of phase detector 2. At instant $t_n$, due to the delay $t_0$ imparted by the delay device 3, this oscillation is still synchronized in phase with the previous echo $E_{(n-1)}$, received from a closer target $O_{(n-1)}$. The phase shift P is therefore the phase shift between the intermediate frequency oscillations respectively resulting from echoes $E_n$ and $E_{n-1}$.

The output signals of detector 2 is applied to one input of a comparator device 6 and to a delay device 5, which imparts a delay equal to the time interval T between two transmitted pulses and is connected to the other input of comparator 6.

If the phase responsive device 2 is a phase and amplitude detector, device 6 may be, for example, a subtractor followed by a full-wave rectifier.

It may be assumed, as is usually done in conventional fixed echo elimination techniques, that the distance from a target to the radar varies sufficiently little during the time interval T for the echoes of two successive radar pulses reflected by the same target, to be received with substantially equal amplitudes and with substantially equal delays $t$ with respect to the respective transmitted pulses from which they originate. Therefore (a), the subtractor and rectifier device 6 receives simultaneously the signal $S_n$, as previously defined, and the signal $S'_n$ corresponding to the preceding radar period, when the phase shift between the echoes $E'_{(n-1)}$ and $E'_n$ received from the same targets $O_{(n-1)}$ and $O_n$ had a value P', and (b) the two signals $S_n$ and $S'_n$ are substantially identical if $P=P'$ and are different in the contrary case. Accordingly, device 6 delivers at the instant $t_n$ a signal $U_n$, which is zero if $P=P'$ and different from zero and of a constant polarity in the opposite case.

A simple calculation shows the $P-P'$ is a linear function of the difference $V_n - V_{(n-1)}$ between the relative radial velocities of the radar with respect to targets $O_n$ and $O_{(n-1)}$, respectively, i.e. that $$P-P'=K[V_n-V_{(n-1)}]$$

where K is a constant which depends only on the radar characteristics.

If $E_n$ and $E_{(n-1)}$ are two fixed targets, then:

$$P-P'=KV[\cos A_n - \cos A_{(n-1)}]$$

where V is the velocity of the radar and $A_n$ and $A_{(n-1)}$ are respectively the angles between the velocity vector of the radar R and vectors $RO_n$ and $RO_{(n-1)}$.

The above relation may also be written as follows:

$$P-P'=2KV \sin \frac{A_n + A_{n-1}}{2} \cdot \sin \frac{A_{n-1} - A_n}{2}$$

Otherwise stated, if $E_n$ and $E_{n-1}$ are two stationary targets, $P-P'$ and, consequently, $U_n$ are substantially zero, in either of the following two cases.

(a) If $A_n - A_{(n-1)}$ is substantially zero, i.e. if the distance between O and $O_{(n-1)}$ is sufficiently small, with respect to their respective distances to the radar, for the straight lines $RO_n$ and $RO_{(n-1)}$ to coincide practically. This makes it possible to eliminate "long echoes," i.e. echoes which are longer than the width of one pulse and which may be considered as a sequence of elementary echoes reflected by targets placed adjacent to one another, and, in particular, grouped ground echoes.

(b) If $A_n$ and $A_{(n-1)}$ are both small. This makes it possible to eliminate echoes from clouds in the vicinity of the axis of the aircraft, at variable distances, and, during a low altitude flight, and most of the ground echoes from targets which may be spaced apart or not.

The system will tend to become generally less efficient when the fixed targets become more spaced apart from one another, while their length becomes smaller. However, such echoes are generally no great inconvenience for the operator.

Of course, the first stationary echo received in response to a transmitted pulse will subsist, since the coherent oscillator does not at that time provide a proper reference value. In fact, only the first elementary echo will subsist, if a "long echo" i.e. a composite echo is concerned.

Also the first fixed elementary echo following a mobile echo will appear as a mobile echo.

Of course, as in all known devices, the targets first entering within the scope of a radar system cannot be immediately eliminated. Also, they will momentarily affect the elimination of the target from which the following echo originates.

At to the mobile echoes, they will normally generate a signal $U_n$, except in the very exceptional situations similar to those resulting from "blind" speeds in conventional systems, i.e. when $V_n - V_{(n-1)}$ has such a value that $P-P'$ is zero or a multiple of $2\pi$.

The system operates normally in the absence of any fixed echo.

Referring again to FIG. 1, the detected signal U appearing at the output 7 of subtractor 6 is a video signal, which is generally zero, or practically zero, for fixed echoes and different from zero for echoes reflected from a mobile target. This signal is then applied to the indicator.

Figure 2:
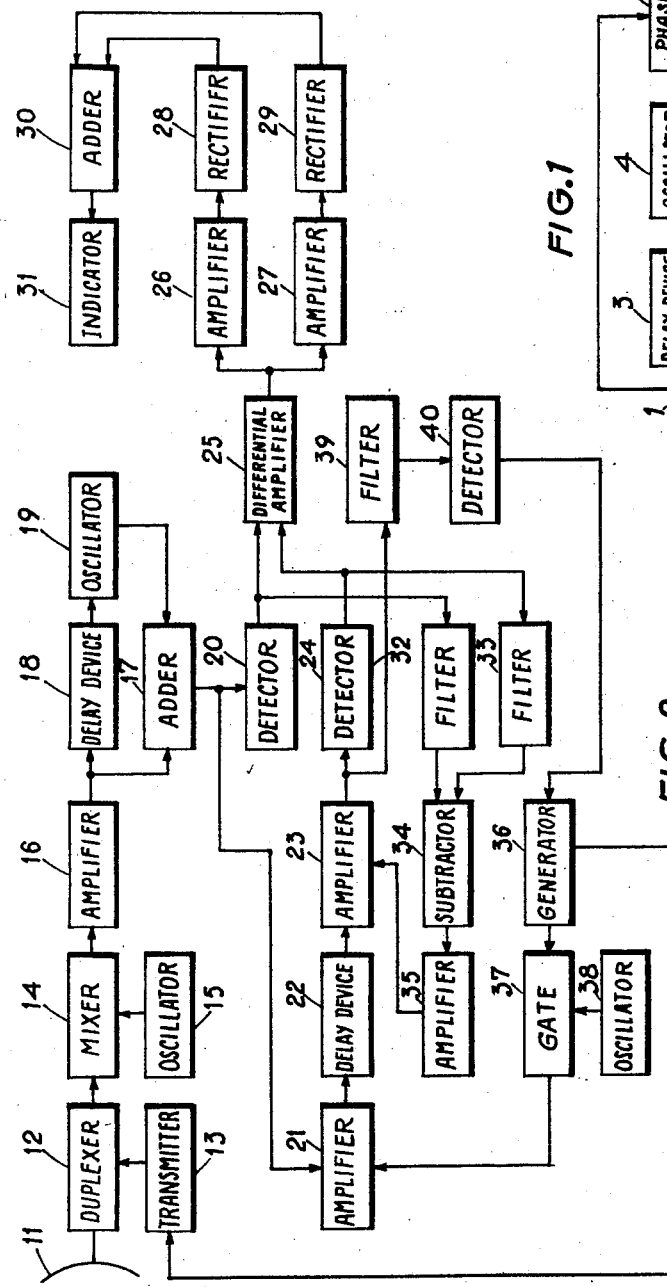
FIG. 2 is a more detailed block-diagram of a system according to the invention.

FIG. 2 is a block diagram of a moving target indicating system according to the invention, wherein the coherent oscillator and the two delay devices operate at the intermediate frequency.

In this figure, an antenna 11, which may be of any conventional type or the sum channel of a monopulse radar antenna, is connected to a duplexer 12 which feeds to antenna 11 the pulses delivered by a transmitter 13. A mixer 14 receives the echoes picked up by antenna 11. The echoes are brought to the intermediate frequency in the mixer 14, which is fed by a local oscillator 15, and are then amplified in an intermediate-frequency amplifier 1, which is preferably a limiting amplifier.

The output of amplifier 16 feeds a first input of an adder circuit 17 and a delay device 18, for example a delay line providing the delay $t_0$ mentioned above. The output of delay line 18 is coupled to one electrode of a coherent oscillator 19, operating at the intermediate frequency, so as to ensure successively the synchronization in phase thereof with each echo received and delayed by $t_0$. The output of oscillator 19 is connected to the second input of adder 17.

Accordingly, there appears at the output of adder 17, at the instant when an echo which has been delayed reaches its first input, a pulse, which is the sum of this echo and of the coherent oscillation provided by oscillator 19 and the amplitude of which is a function of phase-shift P. In the absence of echoes, only the coherent oscillation appears at the output of adder 17 as a false signal which is subsequently eliminated.

In this embodiment, the output signal of the circuit fed by the intermediate frequency amplifier is an intermediate frequency signal. This is the signal which undergoes the delay T.

The output of the summing circuit 17 is applied in parallel to a detector 20 and an intermediate frequency amplifier 21. The output of amplifier 21 is connected to the input of a delay device 22, which is, for example, an ultrasonic line providing a delay T. The output of line 22 feeds an amplifier 23, the output signal of which is detected by a detector 24.

The output signals of detectors 20 and 24, correspond to those which would be obtained if, instead of adder 17, an amplitude and phase detector were used. These two signals feed the two inputs of a differential amplifier 25, which delivers a signal, having a level proportional to the difference between the two signals applied thereto and respectively derived from the detection of signals $S_n$ and $S'_n$. Amplifier 25 also eliminates the "false signals" mentioned above.

Amplifier 25 thus delivers video signals, which may be of positive or negative polarity. It feeds in parallel two amplifiers 26 and 27 with respective gains +1 and −1, the outputs of which are respectively connected, to the anodes of two rectifiers 28 and 29. A positive pulse will thus follow path 26–28 and a negative pulse path 27–29. The output signals of detectors 28 and 29 are summed up in an adder 30, the output of which feeds an indicator 31.

A correct operation of the system requires, however, that the gain of the path delayed by T should be equal to 1, if the difference signal delivered by amplifier 25 is to be correct. To this end, amplifier 23 of the path delayed by T is provided with an automatic gain control operating as follows. The video signals of the same polarity, delivered by detectors 20 and 24, are respectively applied to two identical filters 32 and 33, which have a high time constant, for example of the order of 1 to 2 seconds, and deliver two continuous voltage values respectively representing the mean values of the two signals. These values are subtracted from each other in a subtractor 34 and the resulting difference signal is amplified in an amplifier 35, whose output signal is applied to amplifier 23 to modify the gain thereof in the desired direction to minimize the difference signal.

In order to keep delay T, brought about by the delay line 22, constantly equal to the radar period, the following arrangement is used.

An auxiliary oscillator 38 oscillates at a frequency, which is sufficiently near the intermediate frequency of the receiver to be comprised within the pass-band of the delayed path, but is sufficiently different therefrom to be separated by filtering from the intermediate frequency signals propagating through said path. If, for example, the intermediate frequency of the receiver is 30 mc./s.; that of oscillator 38 may be 35 mc./s.

The output of oscillator 38 feeds the signal input of a gate 37, whose control input is controlled by the pulses delivered by a pulse generator 36. After passing gate 37, the signal is applied to the input of amplifier 21. It is filtered by a filter 39, connected in parallel with detector 24 at the output of amplifier 23, detected by detector 40, connected at the output of this filter and, after detection, controls the pulse generator 36. The latter comprises a second output which is connected to the transmitter for initiating the production of the transmission pulses. The recurrence period of the radar is thus automatically synchronized with the delay in the delayed channel.

Figure 3:
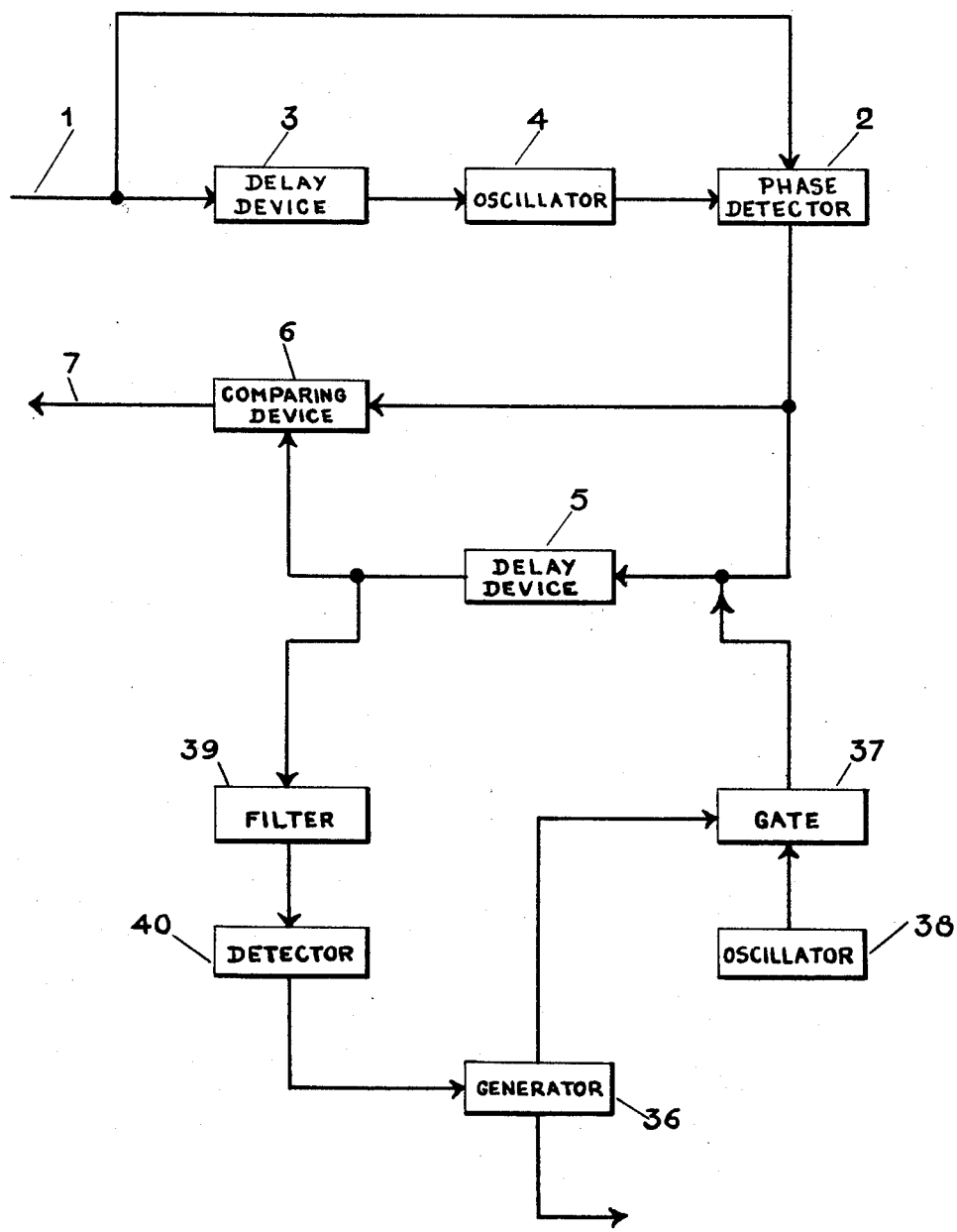
FIG. 3 is a block-diagram showing the combination of the diagram of FIG. 1 with a timing circuit as included in the diagram shown in FIG. 2.

The block-diagram of FIG. 3 shows how a system according to the invention may be combined with the circuit shown in FIG. 2 for matching the period of the radar with the delay imparted by the second delay device of characteristic T. In this figure the references used are those of FIGS. 1 and 2. The upper part of the figure is identical with FIG. 1. In addition the system shown comprises a matching circuit including, as in FIG. 2, wave train generating means 38 coupled to delay device 5 through a switch 37, selecting means, comprising filter 39 and detector 40, and controlling generator 36 which monitors both switch 37 and the radar transmission.

The invention is, of course, not limited to the embodiments described and illustrated, which were given solely by way of example.

What is claimed, is:

1. In a radar system, a device for discriminating the echoes from moving targets, said device comprising: a general input; means for applying the radar echoes to said general input; phase responsive means having a first input directly coupled to said general input, a second input and an output; delay means having an input connected to said general input, and an output; and an oscillator having a phase control input coupled to the output of said delay means and an output coupled to said second input of said phase responsive means.

2. In a radar system, a device for discriminating the echoes from moving targets, said device comprising: a general input; means for applying the radar echoes to said general input; phase responsive means having a first input directly coupled to said general input; first delay means imparting a delay of the order of the duration of a transmitted pulse, and having an input connected to said general input and an output; an oscillator having a phase control input coupled to the output of said first delay means and an output coupled to said second input of said phase responsive means; comparing means having a first input directly coupled to the output of said phase responsive means, a second input and an output; second delay means imparting a delay equal to the recurrence interval of the transmitted radar pulses and having an input coupled to the output of said phase responsive means, and an output coupled to the second input of said comparing means; and indicating means having an input coupled to the output of said comparing means.

3. In a radar system, a device for discriminating the echoes from moving targets, said device comprising: a general input; means for applying the radar echoes to said general input; an adder having a first input coupled to said general input, a second input and an output; first delay means imparting a delay slightly longer than the duration of a transmitted radar pulse, and having an input coupled to said general input and an output; an oscillator having a phase control input coupled to the output of said delay means and an output coupled to the second input of said adder; first detecting means having an input coupled to the output of said adder and an output; second delay means having an input coupled to the output of said adder and an output; second detecting means having an input coupled to the output of said second delay means and an output; subtracting means having a first input coupled to the output of said first detecting means, and a second input coupled to the output of said second detecting means; and indicating means having an input coupled to the output of said subtracting means.

4. A device as claimed in claim 3, comprising means for translating the received echoes to an intermediate frequancy and wherein the echoes applied to said general input are intermediate frequency echoes, said oscillator oscillating at said intermediate frequency.

5. In a radar system comprising a transmitter and a receiver, a device for discriminating the echoes from moving targets, said device comprising a general input; means for applying the radar echoes to said general input; an adder having a first input coupled to said general input, a second input and an output; first delay means imparting a delay slightly longer than the duration of a transmitted radar pulse and having an input connected to the output of said general input and an output; a first oscillator having a phase control input coupled to the output of said first delay means and an output coupled to the second input of said adder, first detecting means having an input coupled to the output of said adder, and an output; a delayed channel comprising second delay means, said delayed channel imparting a delay equal to the recurrence interval T of transmitted radar pulses, and having an input coupled to the output of said adder and an output; second detecting means having an input coupled to the output of said delayed channel and an output; a second oscillator oscillating at a frequency different from the frequency of the output signals of the adder, and having an output; gating means having a signal input coupled to the output of said second oscillator, a control input, and an output coupled to the input of said delayed channel; a filter centered on the frequency of said second oscillator and having an input coupled to the output of said delayed channel, and an output; third detecting means having an input connected to the output of said filter and an output; a pulse generator controlled by said third detector, and having an output coupled to the control input of said gating means and to said transmitter; subtracting means having a first input connected to the output of said first detecting means, a second input coupled to the output of said second detecting means, and an output; and indicating means having an input coupled to the output of said subtracting means.

6. In a radar system comprising a transmitter and a receiver, a device for discriminating the echoes from moving targets, said device comprising: a general input; means for applying the radar echoes to said general input; phase responsive means having a first input directly coupled to said general input; first delay means imparting a delay of the order of the duration of a transmitted pulse, and having an input connected to said general input and an output; an oscillator having a phase control input coupled to the output of said first delay means and an output coupled to said second input of said phase responsive means; comparing means having a first input directly coupled to the output of said phase responsive means, a second input and an output; second delay means imparting a delay equal to the recurrence interval of the transmitted radar pulses and having an input coupled to the output of said phase responsive means, and an output coupled to the second input of said comparing means; indicating means having an input coupled to the output of said comparing means; wave train generating means having an output coupled to said input of said second delay means, and a control input; selecting means having an input coupled to the output of said second delay means for selecting said wave trains, and an output; and means having an input coupled to the output of said selecting means and an output coupled to said transmitter and to said control input of said wave train generating means for simultaneously bringing about the transmission of the radar pulses and the generation of said wave trains.

No references cited.

CHESTER L. JUSTUS, *Primary Examiner.*